United States Patent
Hanan (10) Patent No.: US 7,415,571 B1
(45) Date of Patent: Aug. 19, 2008

(54) DISK DRIVE AND METHOD FOR USING A MAILBOX FILE ASSOCIATED WITH A DISK STORAGE MEDIUM FOR PERFORMING A FUNCTION CHARACTERIZED BY CONTENTS OF THE MAILBOX FILE

(75) Inventor: Thomas D. Hanan, Mission Viejo, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 1087 days.

(21) Appl. No.: 10/004,100

(22) Filed: Oct. 31, 2001

(51) Int. Cl.
*G06F 12/00* (2006.01)
*G06F 13/00* (2006.01)
(52) U.S. Cl. .................. 711/112; 711/114; 711/154
(58) Field of Classification Search ......... 711/111–114, 711/154, 156, 163, 14, 100
See application file for complete search history.

(56) References Cited

U.S. PATENT DOCUMENTS

| | | | |
|---|---|---|---|
| 5,235,641 A | 8/1993 | Nozawa et al. | |
| 5,559,960 A | 9/1996 | Lettvin | |
| 5,677,952 A | 10/1997 | Blakley, III et al. | |
| 5,812,883 A | 9/1998 | Rao | |
| 6,105,133 A | 8/2000 | Fielder et al. | |
| 6,115,816 A | 9/2000 | Davis | |
| 6,173,402 B1 | 1/2001 | Chapman | |
| 6,192,471 B1 | 2/2001 | Pearce et al. | |
| 6,317,815 B1* | 11/2001 | Mayer et al. ................. | 711/165 |
| 6,360,322 B1* | 3/2002 | Grawrock ................... | 713/176 |
| 6,681,304 B1 | 1/2004 | Vogt et al. | |
| 6,728,830 B1 | 4/2004 | Assaf | |
| 6,772,281 B2* | 8/2004 | Hamlin ........................ | 711/112 |
| 6,901,481 B2* | 5/2005 | Olson .......................... | 711/129 |
| 6,966,002 B1 | 11/2005 | Torrubia-Saez | |
| 7,003,674 B1 | 2/2006 | Hamlin | |
| 2002/0010863 A1 | 1/2002 | Mankefors | |

OTHER PUBLICATIONS

Office Action dated Apr. 19, 2005 from U.S. Appl. No. 10/003,675, 8 pages.
Office Action dated Sep. 28, 2005 from U.S. Appl. No. 10/003,675, 11 pages
Office Action dated Mar. 22, 2006 from U.S. Appl. No. 10/003,675, 14 pages
Office Action dated Sep. 14, 2006 from U.S. Appl. No. 10/003,675, 13 pages.

(Continued)

*Primary Examiner*—Tuan V. Thai
(74) *Attorney, Agent, or Firm*—Buchanan Ingersoll, P.C.

(57) ABSTRACT

A disk drive and method are disclosed for using a mailbox file associated with a disk storage medium for performing a function characterized by contents of the mailbox file. In accordance with exemplary embodiments of the present invention, a disk drive comprises a disk storage medium having a first range of disk drive host interface addressable locations accessible by a host computer operating system, at least one of the addressable locations being used to designate a mailbox file. The disk drive comprises a disk controller for responding to a command from the host computer operating system that references the mailbox file to perform a function characterized by contents of the mailbox file.

24 Claims, 6 Drawing Sheets

OTHER PUBLICATIONS

Office Action dated Mar. 19, 2007 from U.S. Appl. No. 10/003,675, 15 pages.
Office Action dated Mar. 5, 2008 from U.S. Appl. No. 10/003,675, 11 pages.
Office Action dated Dec. 9, 2005 from U.S. Appl. No.10/003,675, 3 pages.
Office Action dated Sep. 17, 2007 from U.S. Appl. No. 10/003,675, 4 pages.

* cited by examiner

DISK DRIVE AND METHOD FOR USING A MAILBOX FILE ASSOCIATED WITH A DISK STORAGE MEDIUM FOR PERFORMING A FUNCTION CHARACTERIZED BY CONTENTS OF THE MAILBOX FILE

BACKGROUND

1. Field of the Invention

The present invention relates generally to a disk drive and associated method for accessing storage locations of a disk storage medium, and more particularly, to the use of a mailbox file associated with the disk storage medium for performing a function characterized by contents of the mailbox file.

2. Background Information

Standard communication between a host computer, such as PC-based computer, and a hard disk drive is conventionally performed using a disk drive host interface. The hard disk drive can be, for example, an Integrated Drive Electronics/AT Attachment (IDE/ATA)-compliant hard drive, a SCSI-compliant hard drive, a fibre channel device (e.g., one or more hard drives used with associated fibre channel switches in a multi-disk environment), or any other type of hard disk drive or storage systems.

Generally speaking, the computer's operating system accesses a hard disk drive as an input/output (I/O) device connected to a bus, such as the IDE/ATA, SCSI or fibre channel bus. Conventional techniques for communicating between the host computer and the hard disk drive via a standard bus have been limited to transferring information to and from the hard disk drive via the disk drive host interface using a standard disk drive host interface protocol. Such a convention vests control over all operations with the operating system, and the hard disk drive serves as a slave to the host computer. All command signals are supplied by the host computer to the hard disk drive via the disk drive host interface such that the host computer controls all read and write operations for transferring data from or to the hard disk drive. The disk drive host interface possesses knowledge of all addressable locations on a disk storage medium associated with the hard disk drive, with some of the locations being dedicated for use by the operating system and the remaining locations being designated user space (e.g., available for use by application programs).

With the substantially increased density of hard disk drives, the user space has increased beyond practical demands. As the ability to provide additional disk storage space continues to exceed demand, it would be desirable to develop alternate uses for excess space available in the hard disk drive, and to use the excess space to enhance functionality of the hard disk drive. In so doing, it would be desirable to retain compatibility of the hard disk drive with conventional host computers and their operating systems. In addition, it would be desirable to allow the hard disk drive to provide additional features and functionality within the hard disk drive without the hard disk drive requiring prior knowledge of, and without requiring modification to, the host computer operating system or its associated drivers.

SUMMARY OF THE INVENTION

A disk drive and method are disclosed for using a mailbox file associated with a disk storage medium for performing a function characterized by contents of the mailbox file. In accordance with exemplary embodiments of the present invention, a disk drive comprises a disk storage medium having a first range of disk drive host interface addressable locations accessible by a host computer operating system, at least one of the addressable locations being used to designate a mailbox file. The disk drive comprises a disk controller for responding to a command from the host computer operating system that references the mailbox file to perform a function characterized by contents of the mailbox file.

The present invention may also be regarded as a method for accessing storage locations of a disk storage medium in a disk drive using a disk controller, the disk storage medium having a first range of disk drive host interface addressable locations accessible by a host computer operating system, at least one of the addressable locations being used to designate a mailbox file. In accordance with exemplary embodiments of the present invention, a command from the host computer operating system is recognized as a reference to the mailbox file. The command is responded to by performing a function characterized by the contents of the mailbox file.

The present invention may also be regarded as a method of installation. According to alternate embodiments, a computer system includes a host computer, a disk drive host interface and a disk drive having a disk storage medium with a first range of disk drive host interface addressable locations. A disk drive access key is obtained from an access key server, the access key being generated by the access key server as a function of an identifying characteristic of the disk drive. A mailbox file is created in the first range of addressable locations using the access key obtained from the access key server. The disk drive is notified of a location of the mailbox file in the first range of addressable locations such that the disk drive can perform a function characterized by contents of the mailbox file.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
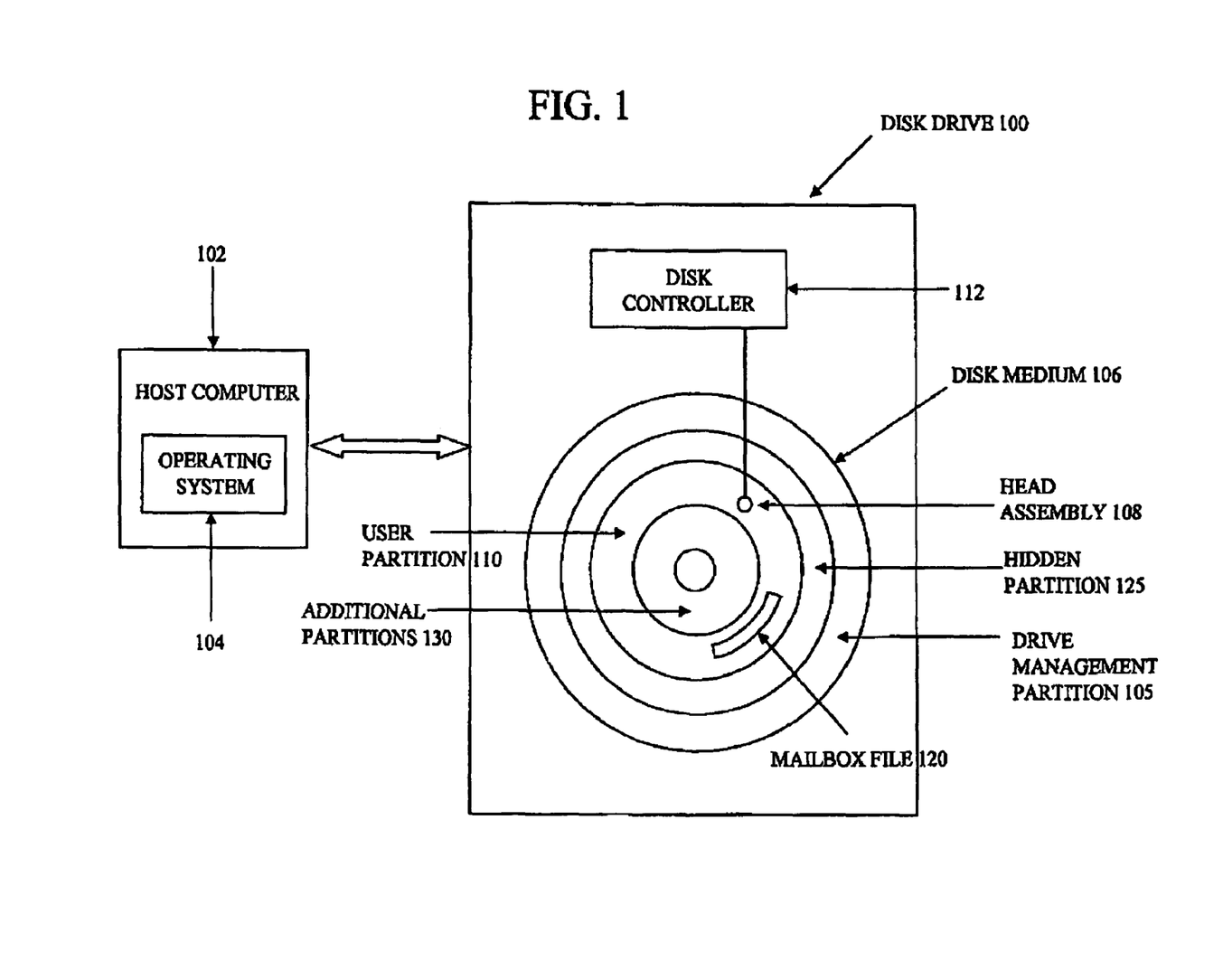
FIG. 1 a block diagram of a disk drive for using a mailbox file associated with a disk storage medium for performing a function characterized by contents of the mailbox file in accordance with an exemplary embodiment of the present invention.

FIG. 1 is a block diagram of a disk drive 100 for using a mailbox file associated with a disk storage medium for performing a function characterized by contents of the mailbox file in accordance with an exemplary embodiment of the present invention. Disk drive 100 can comprise a disk storage medium having a first range of disk drive host interface addressable locations accessible by a host computer operating system, at least one of the addressable locations being used to designate a mailbox file. Disk drive 100 is compatible with at least one operating system that is capable of accessing disk drives and with at least one disk drive host interface. The host computer operating system can be any operating system, such as, for example, Microsoft Windows™, Linux™, MacOS™, Solaris™, or any other computer operating system that is capable of accessing disk drives. The disk drive host interface can be any host interface, such as, for example, an Integrated Drive Electronics/AT Attachment (IDE/ATA) interface, a SCSI interface, a fibre channel interface, an Ethernet interface, an InfiniBand™ interface, a Peripheral Component Interconnect (PCI) interface, or any other host interface that can be used for accessing a hard disk drive.

A disk medium 106 of disk drive 100 can be accessed using a head assembly 108 and can be divided into data storage sectors. Disk drive 100 can include a microprocessor-based disk controller 112 for controlling head assembly 108 for reading from and writing to disk medium 106 using head assembly 108. A hard disk controller is integrated circuit hardware and associated circuitry that are responsible for controlling the hard disk drive. Disk controller 112 can be any part or all of the printed circuit board assembly (PCBA) of the hard disk controller of disk drive 100. Hard disk controllers are known in the art and described, for example, in U.S. Pat. No. 5,909,334, the disclosure of which is hereby incorporated by reference. Each data storage sector can store, for example, 256 or 512 data bytes, or any desired number of bytes. Each sector can be addressed by an operating system using, for example, a logical block address (LBA).

Figure 2:
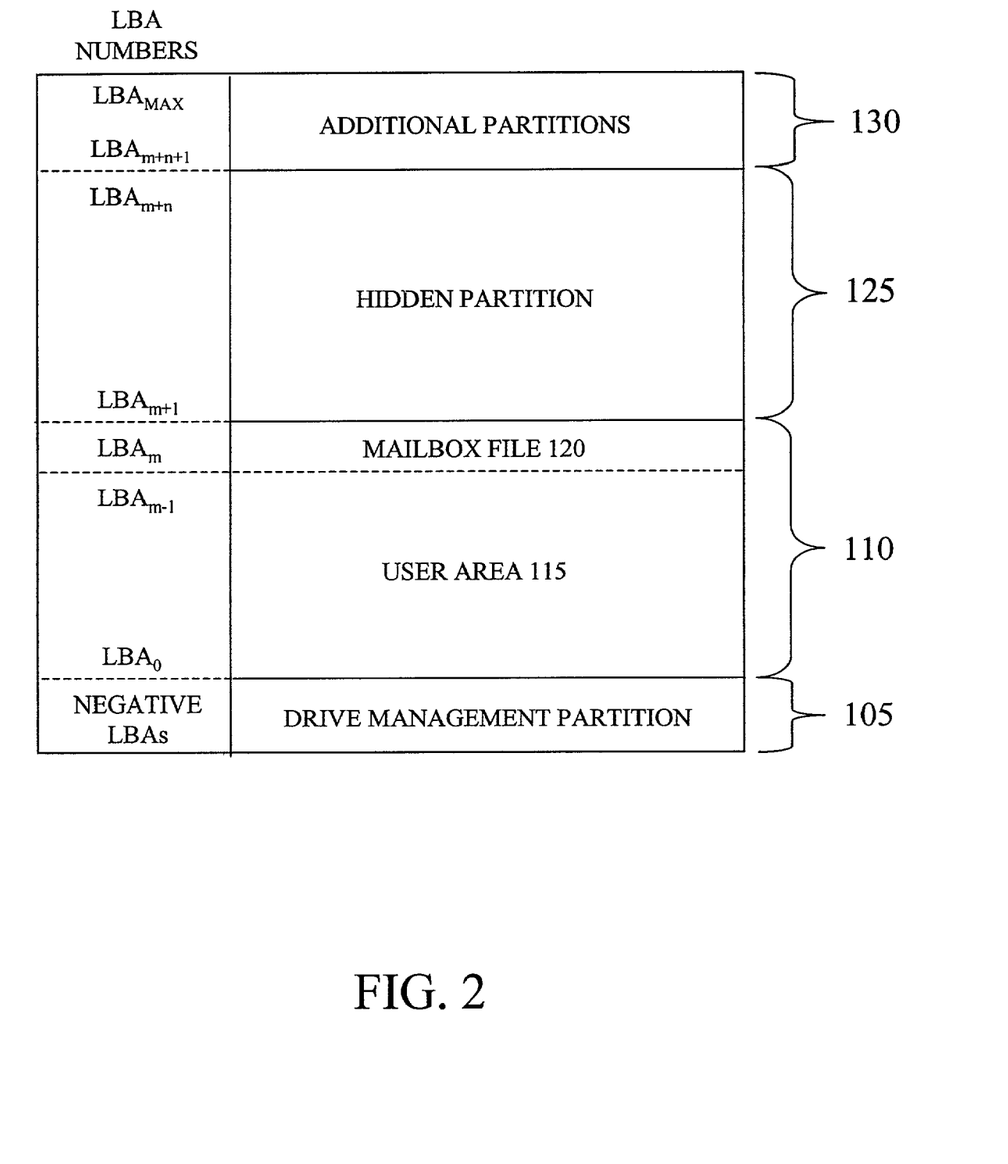
FIG. 2 is a block diagram illustrating the organization of data storage sectors in a disk drive in accordance with an exemplary embodiment of the present invention.

A linear addressing scheme using LBAs for addressing sectors in accordance with exemplary embodiments is shown in FIG. 2. The data storage sectors of disk medium 106 can be organized into a drive management partition 105, a user partition 110, a hidden partition 125, and additional partitions 130, or any other organization of data storage sectors. According to exemplary embodiments, the first range of disk drive host interface addressable locations can be in a first space directly accessible by the host computer operating system. For example, the first space can be user partition 110 or any other area of disk medium 106 that is within an address range known by the disk drive host interface, and therefore accessible by the host computer operating system. User partition 110 can include a user area 115 that can be assigned to any distribution of LBAs, such as, for example, $LBA_0$ through $LBA_m$, where m can be any number less than the maximum LBA ($LBA_{MAX}$).

As shown in FIG. 1, an operating system 104 of a host computer 102 can access the data storage sectors in user partition 110 using an industry standard interface protocol, such as, for example, the IDE/ATA interface, or any other disk drive host interface, between host computer 102 and disk drive 100. Operating system 104 can be any operating system, such as, for example, Microsoft Windows™, Linux™, MacOS™, Solaris™, or any other computer operating system that is capable of accessing disk drives. Host computer 102 can be any computer system, such as, for example, a general purpose personal computer, a workstation, or any other type of computer system that can use disk drives.

According to exemplary embodiments, at least one of the addressable locations of the first range of disk drive host interface addressable locations can be used to designate a mailbox file. As referenced herein, a mailbox file is a functional file contained on the storage medium of a hard disk drive, the file being executable under control of the hard disk drive. The mailbox file is located in at least one of the disk storage medium and a computer memory associated with the disk controller. According to an exemplary embodiment, the mailbox file can be located in computer memory that is accessible by disk controller 112, such as, for example, in random access memory (RAM), cache memory or any other computer memory located internally or externally to disk controller 112. In such an embodiment, a reference to the at least one addressable location on the disk storage medium used to designate the mailbox file would, then, reference the address of the mailbox file stored in the computer memory associated with disk controller 112. According to an alternate exemplary embodiment, the mailbox file can be located on the disk storage medium. As shown in FIG. 2, at least one mailbox file 120 can be located within user area 115 and assigned any LBA within user area 115, such as, for example, $LBA_m$. Any number of mailbox files can be instantiated and located in the disk storage medium, any computer memory associated with the disk controller, or in both locations.

According to exemplary embodiments of the present invention, disk drive 100 can comprise a disk controller (e.g., disk controller 112) for responding to a command from the host computer operating system that references the mailbox file (e.g., mailbox file 120). The disk controller can respond by performing a function characterized by the contents of the mailbox file. For example, disk controller 112 can directly respond to the command from the host computer operating system that references the mailbox file, or, for example, cause an interrupt to firmware (located either internally or externally to disk controller 112) that causes the firmware to respond to the command. Since the disk controller can perform the function, the speed at which the function is performed is accelerated. If the mailbox file is located in any computer memory associated with disk controller 112, further enhanced acceleration can be achieved.

Although according to exemplary embodiments the function characterized by the contents of the mailbox file can be in the form of computer software code, any or all of the functions characterized by the contents of the mailbox file— or procedures to assist in performing any or all of these functions— can be implemented directly in integrated circuit hardware, in firmware, or in any combination of both. In such an alternate exemplary embodiment, the command that references the mailbox file can cause the function implemented in hardware to be executed. However, if the function is in the form of computer software code, the computer hardware in disk controller 112 can be used to perform the function characterized by the contents of the mailbox file. In either embodiment, since computer hardware internal to disk controller 112 is used to perform the function, the speed at which the function is performed is accelerated.

According to exemplary embodiments, mailbox file 120 can contain any form of computer software code for performing any type of function. For example, the function can be used to transfer a key from the mailbox file. Alternatively, the function can be used to perform a data transformation under control of the hard disk drive. For example, the function can be used to access a second range of addressable locations that are not disk drive host interface addressable and that are contained on the disk storage medium. In this latter embodiment, mailbox file 120 can act as a "window" through which the host computer's operating system can access the second range of addressable locations on the disk storage medium. This second range of addressable locations are thus "hidden" from the disk drive host interface and the operating system, and are accessible only by the hard disk drive using the mailbox file. The "hidden" locations can, for example, be used to store information in a secure fashion for access only by designated application programs.

According to exemplary embodiments, disk medium 106 can include a hidden partition, such as, for example, hidden partition 125, that can be a second range of addressable locations that are not disk drive host interface addressable. Hidden partition 125 can be used to exploit the extra storage space on disk medium 106. To access data contained in hidden partition 125, operating system 104 of host computer 102 can issue any type of computer command that references mailbox file 120. In response, disk controller 112 can use a command block contained in mailbox file 120 for accessing the second range of addressable locations, such as, for example, information contained in hidden partition 125. The command received from operating system 104 can contain the command block, which is then stored in mailbox file 120 and executed by disk controller 112. Alternatively, the command received from operating system 104 can merely reference mailbox file 120, which, in response, causes disk controller 112 to use a command block that has been previously stored in mailbox file 120. If, for example, multiple hidden partitions are located on the disk drive (e.g., multiple hidden partitions 125), each hidden partition can have its own associated mailbox file so that access to a particular hidden partition would be performed through its corresponding mailbox file. Alternatively, all hidden partitions or groups of hidden partitions can be accessed through a single mailbox file.

Figure 3:
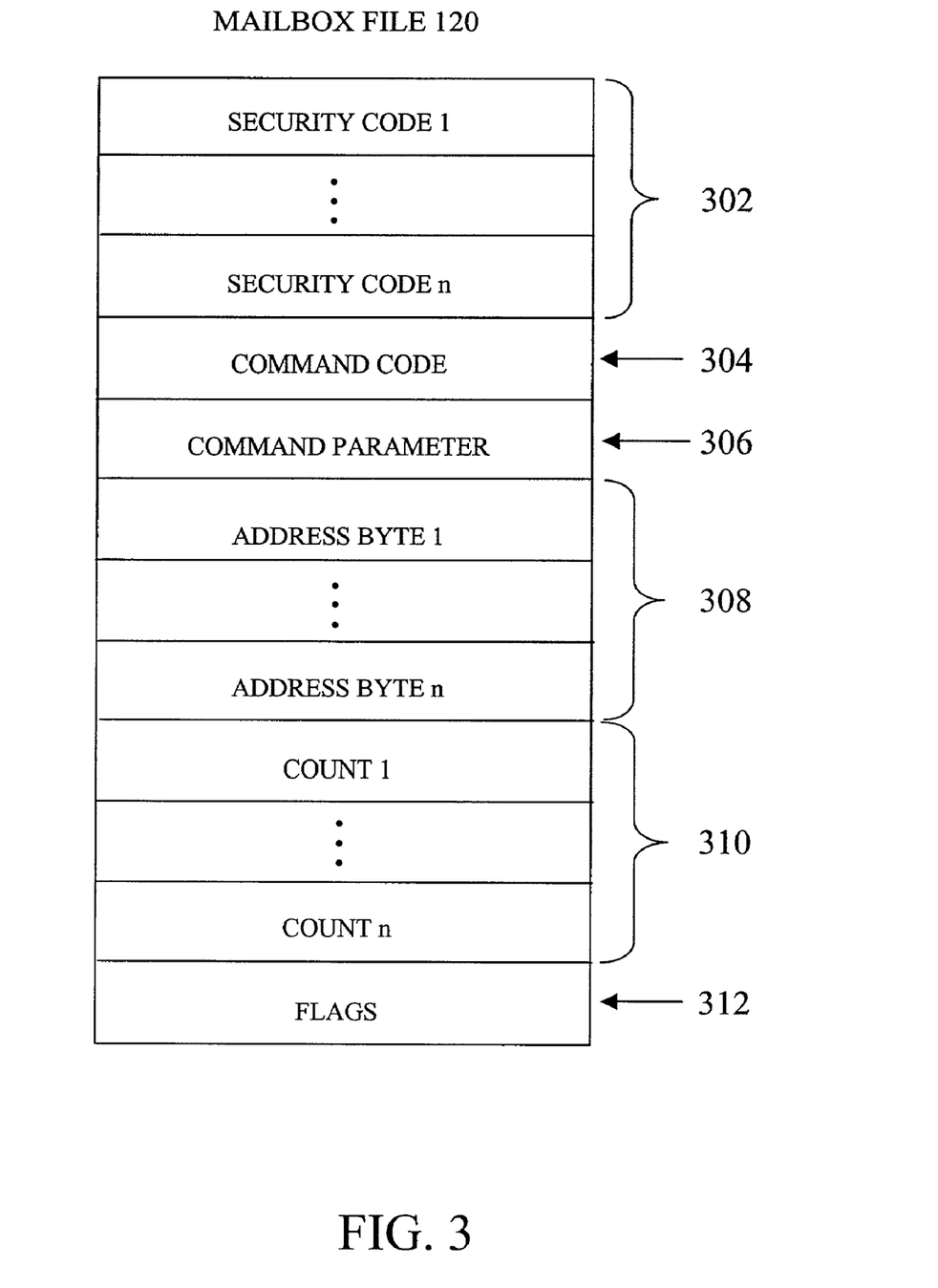
FIG. 3 is a block diagram illustrating an exemplary structure of a mailbox file in accordance with an exemplary embodiment of the present invention.

An exemplary structure of mailbox file 120 that can be used for accessing the second range of addressable locations in hidden partition 125 is shown in FIG. 3. As shown in FIG. 3, mailbox file 120 can include a plurality of security codes 302. According to exemplary embodiments, information can be written to and read from the second range of addressable locations in an encrypted format. Any encryption protocol can be used to encrypt the information. Security codes 302 can be used, for example, to encrypt information written to hidden partition 125 and to decrypt and validate information read from hidden partition 125. However, security codes 302 can be used for any purpose that requires the use of a security code.

Mailbox file 120 can also include at least one command code 304. Command code 304 can be used, for example, to indicate whether a read or write is to take place from or to hidden partition 125, respectively. However, command code 304 can be used for any purpose in which a command is needed to perform a given action.

Mailbox file 120 can also include at least one command parameter 306. Command parameter 306 can be used, for example, to store parameters for use by command code 304, such as, for example, the number of retries for reading or writing data from or to hidden partition 125. However, command parameter 306 can be used to store any type of parameter that can be used by command code 304.

Mailbox file 120 can also include a plurality of address bytes 308. Address bytes 308 can be used, for example, to indicate the addresses within hidden partition 125 at which information resides, e.g., the address to which data has been written in hidden partition 125. In an exemplary embodiment, address bytes 308 identify the start address of a location in hidden partition 125 where information associated with a command to read or write resides.

Mailbox file 120 can also include one or more count values 310. Count values 310 can be used, for example, to indicate the length of the memory block pointed to by the corresponding address bytes 308. Alternatively, count values 310 can be used to indicate the total length of the memory space addressed by address bytes 308 or the number of blocks of free memory in hidden partition 125. In other words, count values 310 can be used for any purpose that requires a numerical count.

Mailbox file 120 can also include at least one flag 312. Flag 312 can be used, for example, to indicate whether the transfer of information from or to hidden partition 125 has completed. However, flag 312 can be used for any purpose that requires the use of a flag. Of course, any number of addresses, counts and other information can be included in mailbox file 120 as desired.

According to exemplary embodiments, the command block contained in mailbox file 120 can be received and/or stored in an encrypted format in mailbox file 120. Referring to FIG. 3, a command block can include security codes 302, command code 304, and command parameter 306. However, a command block can include any combination of the fields of mailbox file 120 or any other desired information. The command block can be encrypted by, for example, an application program running on host computer 102 and decrypted by, for example, disk drive 100 using an access key stored in host computer 102, on disk drive 100, or at any desired location. For example, the access key can be stored in disk drive 100 at the time of manufacture of disk drive 100. The access key can alternately be stored in any location either internal to disk drive 100 or external to disk drive 100 and subsequently loaded onto disk drive 100. Those of ordinary skill in the art will recognize that any encryption protocol can be used to encrypt the command block.

According to exemplary embodiments, to access the information contained in the second range of addressable locations (e.g., hidden partition 125), an application program that has knowledge of the mailbox file can send a command to access mailbox file 120 via operating system 104 of host computer 102. The command received via operating system 104 can be encrypted (using any encryption protocol) or unencrypted. If the command is encrypted, disk controller 106 can be used to decrypt and validate the command using, for example, an access key stored on disk drive 100 or in any other desired location.

Disk controller 112 can respond to the command by performing the function characterized by the contents of mailbox file 120. For example, when the command is a read or write with respect to hidden space on the disk drive (e.g., hidden partition 125), and the function characterized by the mailbox file is an access to locations within the hidden space, the command block can be used to access the second range of addressable locations. If the command block stored in mailbox file 120 is encrypted, an access key stored, for example, on disk drive 100 or in any other desired location can be used to decrypt and validate the command block. The command block, after being decrypted and validated, can then be used to trigger access to the information stored in the second range of addressable locations under control of disk controller 112.

For example, if command code 304 indicates a data read, data can be read from address bytes 308 and security codes 302 can be used to decrypt and validate the data stored at these addresses. The decrypted and validated data from the second range of addressable locations (e.g., hidden partition 125) can then be transferred to host computer 102. According to alternative exemplary embodiments, mailbox file 120 can be used simply to transfer encrypted data from the second range of addressable location to host computer 102, or any designated location, where it can be decrypted and validated once it is received. Any encryption protocol can be used for encrypting the data and commands.

Referring to FIG. 2, the drive management partition 105 can be assigned to negative LBA numbers and the corresponding data storage sectors can be accessed using drive management commands. The data in the drive management partition can include disk drive configuration and physical format information written by the disk-drive manufacturer during initial testing and configuration of disk drive 100. The drive management commands can vary from manufacturer to manufacturer. Data storage sectors can also be organized into any other type of additional partitions 130, such as, for example, a disk-drive-selected application partition that can be configured by a manufacturer before shipment of disk drive 100 and that is visible to disk controller 112 but not visible to host computer 102.

Figure 4:
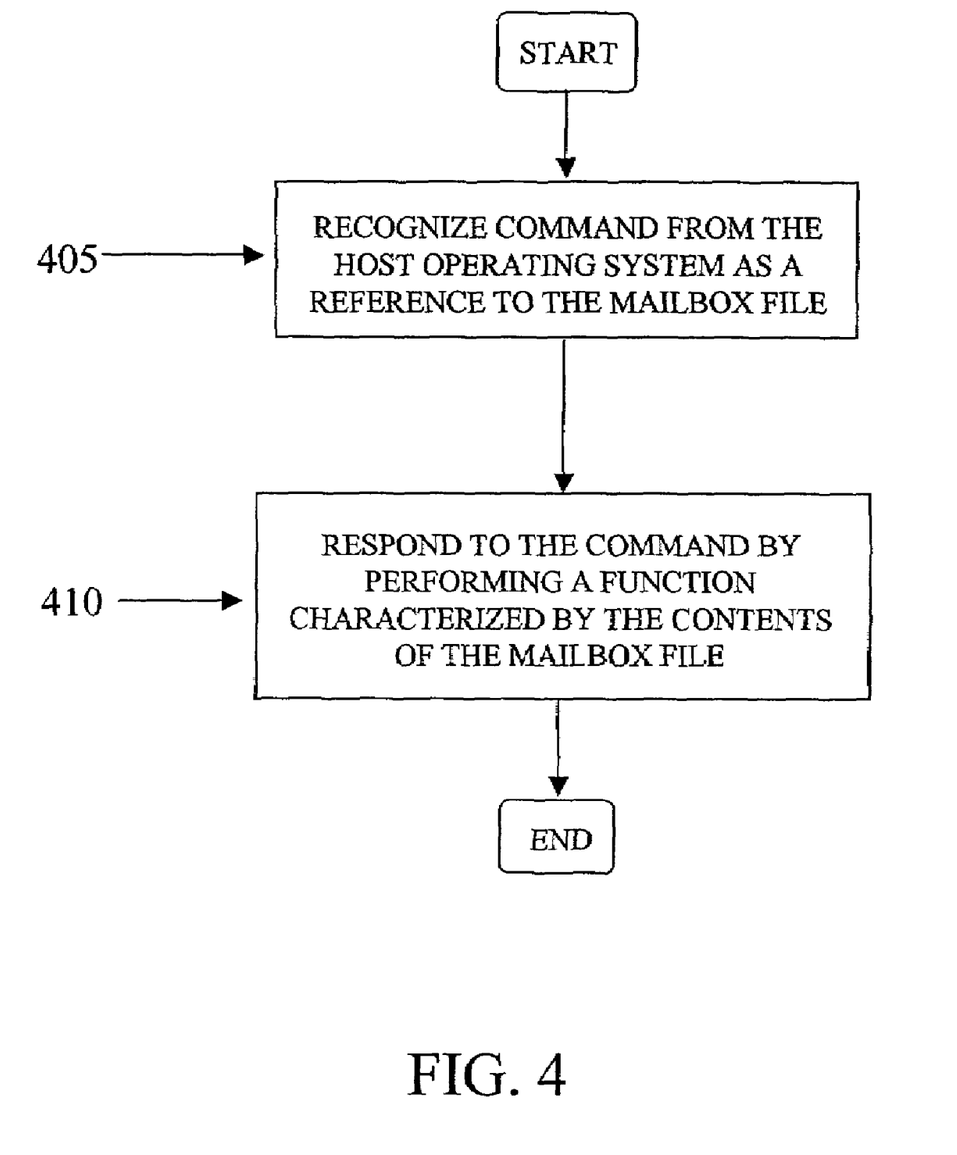
FIGS. 4 and 5 are flowcharts illustrating the steps carried out for using a mailbox file associated with a disk storage medium for performing a function characterized by contents of the mailbox file in accordance with an exemplary embodiment of the present invention.
Figure 5:
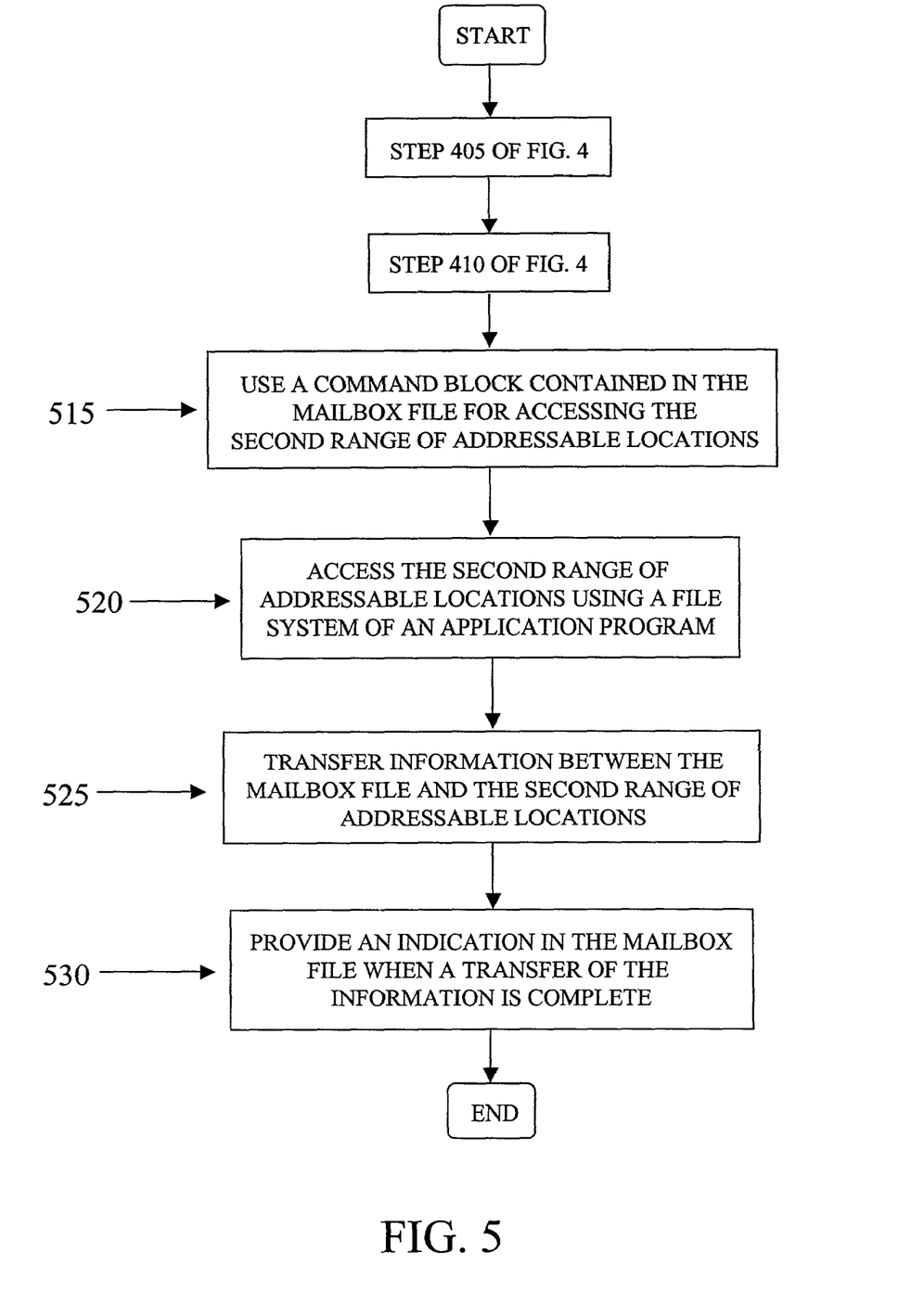

FIGS. 4 and 5 are flowcharts illustrating steps carried out for accessing storage locations of a disk storage medium in a disk drive using a disk controller, the disk storage medium having a first range of disk drive host interface addressable locations accessible by a host computer operating system, at least one of the addressable locations being used to designate a mailbox file, in accordance with an exemplary embodiment of the present invention. In step 405 of FIG. 4, a command from the host computer operating system is recognized as a reference to the mailbox file. Typically, the command can originate from an application program running on the host computer that has knowledge of the mailbox file.

The mailbox file can be located in the disk storage medium or any computer memory associated with the disk controller. According to an exemplary embodiment, the mailbox file can be located in computer memory that is accessible by the disk controller, such as, for example, in random access memory (RAM), cache memory or any other computer memory located internally or externally to the disk controller. In such an embodiment, a reference to the at least one addressable location on the disk storage medium used to designate the mailbox file would, then, reference the address of the mailbox file stored in the computer memory associated with the disk controller. According to an alternate exemplary embodiment, the mailbox file can be located on the disk storage medium.

In step 410, the command is responded to by performing a function characterized by the contents of the mailbox file. The function characterized by the contents of the mailbox file can be any function, such as, for example, to transfer a key from the mailbox file or to perform a data transformation or any other function.

According to an exemplary embodiment, a command validation key can be associated with mailbox file 120, such as, for example, stored in mailbox file 120 or at any desired location, that can be used to validate or reject the command that references the mailbox file. Thus, if the command is validated using the command validation key, the command is executed by performing the function characterized by contents of the mailbox file. If the command is rejected using the command validation key, the command is not executed and is rejected. For each mailbox file created and located on the disk storage medium or in any computer memory associated with the disk controller, a unique command validation key can be associated with each mailbox file. Consequently, each mailbox file will execute those commands that are validated by the mailbox file's unique command validation key. Such an alternate exemplary embodiment can be used to combat, for example, denial of service computer attacks on the disk drive and host computer operating system. Those of ordinary skill in the art will recognize that any protocol that permits verification of the identity of the originator of a command (e.g., encryption protocols, cryptographic protocols) can be used to validate or reject the command that references the mailbox file. For example, the command validation key can be the private key of a public-key/private-key pair used in a public key infrastructure (asymmetric encryption) or a single key used for symmetric encryption.

In one embodiment, the function can be used to access a second range of addressable locations that are not disk drive host interface addressable and that are contained on the disk storage medium. Steps for performing an access to the second range of addressable locations are shown in FIG. 5.

In step 515 of FIG. 5, a command block contained in the mailbox file can be used for accessing the second range of addressable locations. The command block can include any type of instructions or executable code for performing the function of accessing the second range of addressable location. The command block can be received and stored in either encrypted or unencrypted form. Additionally, as specified by the command block, information can be written to and/or read from the second range of addressable locations in either encrypted or unencrypted form.

In step 520, the second range of addressable locations can be accessed using a file system of an application program. According to exemplary embodiments, the application program can write information to the disk storage medium in either encrypted or unencrypted form. In step 525, information can be transferred between the mailbox file and the second range of addressable locations. When the number of locations in the second range of addressable locations associated with an information transfer exceed the available space in the mailbox file, multiple transfers between the second range of addressable locations and the host computer can be executed. According to exemplary embodiments, an encrypted command from the application program can be decoded within the disk drive to initiate the step of transferring. The information can be stored on the disk drive and transferred between the disk drive and the application program in an encrypted form. In step 530, an indication can be provided in the mailbox file when a transfer of the information is complete.

Figure 6:
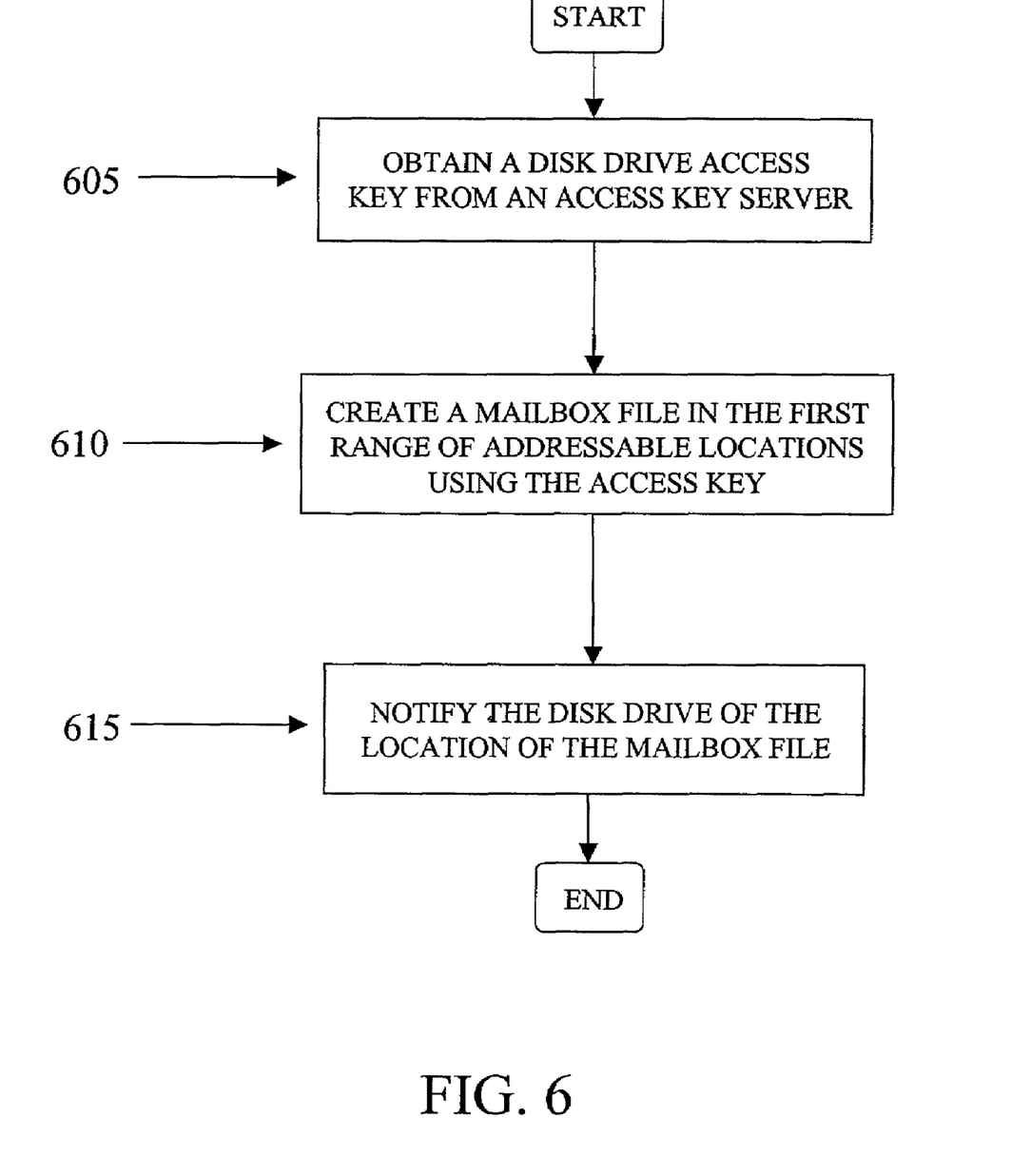
FIG. 6 is a flowchart illustrating steps for installation of a mailbox file in a computer system in accordance with an exemplary embodiment of the present invention.

FIG. 6 is a flowchart illustrating steps for installation of a mailbox file in a computer system, including a host computer, a disk drive host interface and a disk drive having a disk storage medium with a first range of disk drive host interface addressable locations, in accordance with an exemplary embodiment of the present invention. In step 605 of FIG. 6, a disk drive access key is obtained from an access key server. The access key can be, for example, any form of password for gaining access to information. Alternatively, the access key can be associated with any form encryption protocol that can be used to decrypt information or to verify an identity before a mailbox file can be created. For example, the access key could be the private key of a public-key/private-key pair used in a public key infrastructure (asymmetric encryption) or a single key used for symmetric encryption. Those of ordinary skill in the art will appreciate that the access key can be associated with any form of data compression algorithm that can be used in place of or in conjunction with the encryption protocol. Thus, the access key prevents installation by an individual who does not have the corresponding key.

The access key can be obtained from an access key server that can be located at any desired location, for example, remotely over a computer network, such as, for example, the Internet. Alternatively, the access key can be obtained from the access key server and stored in and retrieved from either the host computer or the disk drive itself or from any other desired location. The access key can also be supplied by a user on, for example, a floppy disk or other portable disk storage medium (e.g., CD-ROM).

The access key can be generated by the access key server as a function of an identifying characteristic of the disk drive. Any form of identifying characteristic of the disk drive can be used, for example, the serial number of the disk drive, the make, the model, a unique designator assigned by the manufacturer, or any other identifying characteristic of the disk drive.

In step 610, a mailbox file can be created in the first range of addressable locations using the access key obtained from the access key server. The access key can be used to instantiate at least one mailbox file. Thus, any number of mailbox files can be instantiated and located in the disk storage medium, any computer memory associated with the disk controller, or in both locations. In step 615, the disk drive can be notified of the location of the mailbox file in the first range of addressable locations such that the disk drive can perform a function characterized by the contents of the mailbox file.

According to exemplary embodiments, the function can be used to access a second range of addressable locations that are not disk drive host interface addressable and that are contained on the disk storage medium. For such an access function, the access key can be required for an application program to access the second range of addressable locations via the mailbox file.

What is claimed is:

1. A disk drive, comprising:
   a disk storage medium having a first range of disk drive host interface addressable locations accessible by a host computer operating system, at least one of the addressable locations being used to designate a mailbox file executable under control of the disk drive; and
   a disk controller for responding to a command from the host computer operating system that references the mailbox file to perform a function characterized by contents of the mailbox file.

2. A disk drive according to claim 1, wherein the mailbox file is located in at least one of the disk storage medium and a computer memory associated with the disk controller.

3. A disk drive according to claim 1, wherein the first range of disk drive host interface addressable locations is in a first space directly accessible by the host computer operating system.

4. A disk drive according to claim 1, wherein the function is used to access a second range of addressable locations used to store information that are not disk drive host interface addressable and that are contained on the disk storage medium.

5. A disk drive according to claim 4, wherein the information is written to the second range of addressable locations in an encrypted format.

6. A disk drive according to claim 4, wherein the disk controller uses a command block contained in the mailbox file for accessing the second range of addressable locations.

7. A disk drive according to claim 6, wherein the command block is stored in an encrypted format in the mailbox file.

8. A disk drive according to claim 7, wherein information is written to the second range of addressable locations in an encrypted format.

9. A disk drive according to claim 1, wherein the function is used to transfer a key from the mailbox file.

10. A disk drive according to claim 1, wherein the function is used to perform a data transformation.

11. A disk drive according to claim 1, the disk drive being compatible with at least one operating system that is capable of accessing disk drives and with at least one disk drive host interface.

12. A method for accessing storage locations of a disk storage medium in a disk drive using a disk controller, the disk storage medium having a first range of disk drive host interface addressable locations accessible by a host computer operating system, at least one of the addressable locations being used to designate a mailbox file executable under control of the disk drive, the method comprising the steps of:
   recognizing a command from the host computer operating system as a reference to the mailbox file; and
   responding to the command by performing a function characterized by contents of the mailbox file.

13. A method according to claim 12, wherein the mailbox file is located in at least one of the disk storage medium and a computer memory associated with the disk controller.

14. A method according to claim 12, wherein the function is used to access a second range of addressable locations used to store information that are not disk drive host interface addressable and that are contained on the disk storage medium.

15. A method according to claim 14, comprising the step of:
   using a command block contained in the mailbox file for accessing the second range of addressable locations.

16. A method according to claim 15, wherein the command block is stored in an encrypted format in the mailbox file.

17. A method according to claim 16, wherein the information is written in an encrypted format to the second range of addressable locations.

18. A method according to claim 14, wherein the step of responding comprises the step of:
   transferring information between the mailbox file and the second range of addressable locations.

19. A method according to claim 18, comprising the step of:
   providing an indication in the mailbox file when a transfer of the information is complete.

20. A method according to claim 18, comprising the step of:
   decoding an encrypted command from the application program, within the disk drive, to initiate the step of transferring.

21. A method according to claim 20, wherein the information is stored on the disk drive, and transferred between the disk drive and the application program in an encrypted form.

22. A method according to claim 12, wherein the function comprises the step of:
   accessing the second range of addressable locations using a file system of an application program.

23. A method according to claim 22, wherein the application program writes information in an encrypted format to the disk storage medium.

24. A method according to claim 12, comprising the step of:
   using a command validation key associated with the mailbox file to at least one of validate and reject the command.

* * * * *